United States Patent
Neubauer et al.

(10) Patent No.: US 10,457,600 B2
(45) Date of Patent: Oct. 29, 2019

(54) METHOD FOR REDUCING AGGLOMERATION IN GYPSUM PLASTER OR FILLING COMPOSITIONS COMPRISING CELLULOSE ETHER

(71) Applicant: Dow Global Technologies LLC, Midland, MI (US)

(72) Inventors: Joerg Neubauer, Hamburg (DE); Sonja Scharlemann, Wedemark (DE)

(73) Assignee: Dow Global Technologies LLC, Midland, MI (US)

( * ) Notice: Subject to any disclaimer, the term of this patent is extended or adjusted under 35 U.S.C. 154(b) by 1081 days.

(21) Appl. No.: 14/362,954

(22) PCT Filed: Dec. 4, 2012

(86) PCT No.: PCT/US2012/067752
§ 371 (c)(1),
(2) Date: Jun. 5, 2014

(87) PCT Pub. No.: WO2013/085897
PCT Pub. Date: Jun. 13, 2013

(65) Prior Publication Data
US 2015/0122152 A1 May 7, 2015

Related U.S. Application Data

(60) Provisional application No. 61/568,899, filed on Dec. 9, 2011.

(51) Int. Cl.
| | | |
|---|---|---|
| *C04B 11/00* | (2006.01) | |
| *C04B 16/04* | (2006.01) | |
| *C04B 16/02* | (2006.01) | |
| *C04B 28/14* | (2006.01) | |
| *C04B 40/00* | (2006.01) | |
| *C04B 111/00* | (2006.01) | |

(52) U.S. Cl.
CPC .............. *C04B 11/00* (2013.01); *C04B 16/02* (2013.01); *C04B 16/04* (2013.01); *C04B 28/14* (2013.01); *C04B 40/0039* (2013.01); *C04B 2111/00198* (2013.01)

(58) Field of Classification Search
CPC ......... C04B 11/00; C04B 16/02; C04B 24/14; C04B 24/383; C04B 28/14; C04B 40/0039; C04B 40/0608; C04B 16/04; C04B 2111/00198
See application file for complete search history.

(56) References Cited

U.S. PATENT DOCUMENTS

| | | |
|---|---|---|
| 6,576,698 B1 | 6/2003 | Weitzel |
| 2003/0005861 A1 | 1/2003 | Dietrich et al. |
| 2004/0258901 A1 | 12/2004 | Luckevich et al. |
| 2005/0024539 A1 | 2/2005 | Okamoto |
| 2005/0024540 A1 | 2/2005 | Kim et al. |
| 2005/0024542 A1 | 2/2005 | Hahn |
| 2005/0024543 A1 | 2/2005 | Ramaswamy et al. |
| 2005/0241541 A1* | 11/2005 | Hohn ................ B63H 3/008 106/805 |

FOREIGN PATENT DOCUMENTS

| | | |
|---|---|---|
| CN | 101337798 A | 1/2009 |
| CN | 101734896 A | 6/2010 |
| CN | 102002737 | 4/2011 |
| EP | 0774445 A1 | 5/1997 |
| EP | 2022769 A1 | 2/2009 |
| FR | 2421153 A1 | 10/1979 |
| WO | 9964368 A1 | 12/1999 |
| WO | 2008122345 A1 | 10/2008 |
| WO | 2009018876 A1 | 2/2009 |

OTHER PUBLICATIONS

Baumann et al., "Controlling the application performance of cement renders with cellulose ether," ZKG International Bauverlag B.V., Getersloh, DE., vol. 63, No. 4, Apr. 1, 2010, pp. 66-75.
Search report from corresponding European 12 799 486.1 application, dated Feb. 8, 2018.

\* cited by examiner

*Primary Examiner* — Shuangyi Abu Ali

(57) ABSTRACT

The present invention relates to a method for providing modified gypsum plaster or filling compositions having reduced agglomeration in comparison to gypsum plaster or filling compositions comprising cellulose ether in a specific amount from 0.1 to 1.0 weight percent, based on the total dry weight of said composition. Also provided are dry mortars comprising cellulose ether, gelatin and gypsum for use in such methods, and gypsum-free mixtures comprising cellulose ether and gelatin which may be added to gypsum binder for use a for use in such methods.

2 Claims, No Drawings

METHOD FOR REDUCING AGGLOMERATION IN GYPSUM PLASTER OR FILLING COMPOSITIONS COMPRISING CELLULOSE ETHER

The present invention relates to a method for providing modified gypsum plaster or filling compositions having reduced agglomeration in comparison to gypsum plaster or filling compositions comprising water soluble cellulose ether in a specified amount from 0.1 to 1.0 weight percent, based on the total dry weight of said composition. Also provided are dry mortars comprising water soluble cellulose ether, gelatin and gypsum for use in such methods, and gypsum-free mixtures comprising water soluble cellulose ether and gelatin which may be added to gypsum binder for use in such methods.

BACKGROUND

Gypsum-plaster and filling compositions are generally prepared at the point of use by combining gypsum mortars, i.e. dry mixtures comprising not less than 10 weight percent gypsum, based on the total dry weight of the mortar, with an amount of water sufficient to enable the application of the resultant plaster or filling composition to a surface prior to it setting and hardening upon drying.

Conventional plaster and filling compositions often comprise a combination of gypsum and one or more additives such as, for example, thickeners, retarding agents, accelerating agents, dispersing agents, plasticizers and stabilizers, thereby providing a modified gypsum plaster or filling composition with improved physical characteristics. In particular, wetting agents or water retention additives may be utilized to impart a beneficial effect upon the physical characteristics of the plaster or filling compositions and/or the resultant hardened product, which are highly dependent upon both the initial hydration process and the subsequent water removal as the composition sets and hardens upon drying. For example, the incorporation of wetting agents or water retention additives may lead to a beneficial effect upon processing properties such as viscosity, open time, setting rate and drying time.

The use of polysaccharide derivatives, in particular water soluble cellulose ether compounds, as water retention additives in gypsum mortars is well known. For example, US-A-2004/0258901 discloses a gypsum plaster comprising a water soluble cellulose ether binder that has a preferred molecular weight between 12,000 and 30,000. In addition, US-A-2003/0005861 discloses a dry gypsum based mortar formulation modified with water-redispersible polymer powders for use in the construction industry. The thickeners suitable for use in this formulation include polysaccharides such as cellulose ethers. Further, EP-A-0774445 discloses a lime-containing gypsum plaster composition that uses a combination of a non-ionic cellulose ether and carboxymethylcellulose as the water retaining agent and thickener. The combination of these additives results in a prolonged open time.

In addition to cellulose ether, gypsum plaster compositions are known to contain other additives. For example, US-A-2005/0241541 discloses a mixture composition for use in preparing modified gypsum plasters, wherein the resultant plaster comprises 0.01 to 1.0 weight percent alkylhydroxyalkyl cellulose and/or hydroxyalkyl cellulose prepared from raw cotton linters and 0.0001 to 10 weight percent at least one additive. The list of specific additives generically disclosed includes, inter alia, gelatin.

When cellulose ether particles included in such gypsum mortars become solublized upon combination with water, the composition is thickened. As a consequence of such thickening, the aqueous phase tends not to wet the gypsum particles uniformly. Such non-uniform wetting of the gypsum particles can cause agglomeration of the components in the composition, resulting in the formation of visual defects such as clusters, lumps or nodules, collectively known as agglomerate structures, which become particularly apparent after the application of such compositions to a substrate, which may be either by spraying in the case of machine application or by hand. Such agglomeration can provide an unsatisfactory finish to the hardened composition, and consequently, once identified, can necessitate removal and intensive reworking of the wet gypsum composition to attempt to remove or reduce such agglomerate structures in the composition or smoothing the dry hardened surface by, e.g. sanding.

The problem of agglomeration in gypsum compositions comprising cellulose ethers is discussed in WO 99/64368, wherein an additive is used consisting mainly of cellulose ether and small amounts of polymerized carboxylic acid and a methacrylate or acrylate homo- or interpolymer. However, the use of aqueous carboxylic acid solutions can lead to a pH induced chain degradation of the cellulose ether. The problem of agglomeration is also disclosed in WO2009/018876, wherein an alkyl hydroxyalkycellulose is treated with a crosslinking agent, such as monoaldehydes, dialdehydes, e.g. glyoxal, and silicon compounds. However, the crosslinking reaction is dependent upon the pH of the resultant composition, with a high pH inducing rapid cleavage of the cross-linking. Accordingly, the pH of the composition must be carefully controlled in order that the crosslinking reaction occurs on a timeframe suitable for reducing agglomeration.

Whilst the problem of agglomeration in such modified gypsum plaster and/or filling compositions is addressed to some extent in the above prior art references, the solutions presented by the prior art rely upon the compositions having a high or low pH, which may be detrimental to the composition or suitability for application. Accordingly, there remains a desire to obtain a reduction in agglomeration within cellulose ether containing plaster or filler compositions without causing any significant detrimental effects on the performance or properties of the cellulose ether-containing gypsum compositions.

STATEMENT OF THE INVENTION

The present invention in its various aspects is as set out in the accompanying claims.

According to a first aspect, the present invention provides a method for providing a modified gypsum plaster or filling composition having reduced agglomeration in comparison to a gypsum plaster or filling composition comprising a water soluble cellulose ether in a specified amount X, where the specified amount is from 0.1 to 1.0 weight percent based on the total dry weight of said composition components, said method comprising: forming a dry mortar comprising gypsum binder; water soluble cellulose ether in an amount of X minus Y; and gelatin in an amount Y, wherein Y is from 0.02X to 0.30X; and combining said dry mortar with water to form a modified gypsum plaster or filling composition.

According to a second aspect, the present invention provides a dry mortar comprising gypsum binder, cellulose ether and gelatin for use in the first aspect of the present invention, wherein said mixture comprises 0.1 to 1.0 weight percent, based on the total weight of said dry mortar, of a mixture consisting of water-soluble cellulose ether and gelatin, and wherein the weight ratio of cellulose ether to gelatin is from 49:1 to 7:3.

According to a third aspect, the present invention provides a gypsum-free mixture comprising water soluble cellulose ether and gelatin, which may be added to gypsum binder for use in the first aspect of the present invention, wherein the weight ratio of cellulose ether to gelatin is from 49:1 to 7:3.

Gypsum plaster and filling compositions prepared according to the present invention demonstrate relatively reduced agglomeration without any significant detrimental effects on the performance or properties of the composition. Further, the compositions can be provided at a pH of about 7, thereby overcoming the problems associated with the provision of the prior art compositions that essentially rely upon the use of high or low pH conditions to reduce agglomeration.

DETAILED DESCRIPTION OF THE INVENTION

It has been discovered surprisingly that agglomeration in a gypsum plaster or filling composition is reduced when 2 to 30 weight percent of an amount of water soluble cellulose ether normally added to the composition to provide desirable properties, e.g. high water retention and low slump, is substituted with gelatin without causing a significant detrimental effect on said desirable properties, provided that the total amount of water soluble cellulose ether and gelatin included within said composition is from 0.1 to 1.0 weight percent, based on the total dry weight of said composition components. Preferably, the total amount of water soluble cellulose ether and gelatin included within said composition is from 0.1 to 0.5 weight percent, even more preferably from 0.15 to 0.4 weight percent, based on the total dry weight of said composition components. Such preferred amounts of cellulose ether and gelatin are believed to provide a good reduction in agglomeration in plaster or filling compositions suitable for machine application.

In the present invention, a mix of water soluble cellulose ether and gelatin is present in a weight ratio of 7:3 to 49:1. Preferably, the cellulose ether and gelatin are present in a weight ratio of at greater than or equal to 3:1, more preferably greater than or equal to 4:1. At the same time, the cellulose ether and gelatin are preferably present in a weight ratio of less than or equal to 19:1, more preferably less than or equal to 9:1.

In the first aspect of the present invention, a dry mortar is formed comprising gypsum binder, water soluble cellulose ether in an amount of X minus Y, and gelatin in an amount Y, both amounts being percent weights based on the total dry weight of said dry mortar, wherein Y is from 0.02X to 0.30X. Preferably, Y is greater than or equal to 0.05X, more preferably greater than 0.1X. At the same time, Y is preferably less than or equal to 0.25X, more preferably less than or equal to 0.2X.

Any cellulose ether that is soluble in water at 20° C. is believed to be suitable for use in the present invention. In such compounds, the hydroxyl groups present in cellulose may be partially or fully replaced by —OR groups, wherein R is selected from a $(C_1-C_6)$ alkyl group, a hydroxy$(C_1-C_6)$ alkyl group and mixtures thereof. The presence of an alkyl substitution in cellulose ethers is conventionally described by the DS, i.e. the average number of substituted OH groups per anhydroglucose unit. For example, a methyl substitution is specified as DS (methyl) or DS (M). Similarly, the presence of a hydroxyalkyl substitution is conventionally described by the MS, i.e. the average number of moles of the esterification reagent which are bound in an ether-like manner per mole of anhydroglucose units. For example, the etherification with the ethylene oxide is stated as MS (hydroxyethyl) or MS (HE) and the etherification with propylene oxide as MS (hydroxypropyl) or MS (HP). The determination of the DS and MS is effected by the Zeisel method which is described, for example, in P. W. Morgan, *Ind. Eng. Chem. Anal. Ed.* 18 (1946) 500-504, and R. U. Lemieux, C. B. Purves, *Can. J. Res. Sect. B* 25 (1947) 485-489.

The cellulose ethers suitable for use in the present invention may be prepared by conventional methods known in the art. Typically, the production process comprises the step of activating the cellulose, for example by treatment with an alkali metal hydroxide, before reacting the activated cellulose with etherifying agent(s) and washing the resultant cellulose ether in water or other washing liquors such as isopropanol, acetone, methylethylketone or brine to remove by-products. Following the washing step, the cellulose ether, which may be in the form of granules, lumps and/or paste, is separated from the washing liquor by any conventional method, e.g. centrifugation, and typically has a moisture content of from 30 to 60 percent based on the total weight of the moist cellulose ether. The moist cellulose ether is then subjected to drying and grinding, which may be carried out simultaneously in a single process step conventionally referred to as dry-grinding.

The water soluble cellulose ether is preferably an alkylhydroxyalkylcellulose, a hydroxyalkyl cellulose or an alkyl cellulose, or a mixture of such cellulose ethers. Examples of cellulose ether compounds suitable for use in the present invention include, for example, methylcellulose (MC), methylhydroxyethylcellulose (MHEC), methylhydroxypropylcellulose (MHPC), hydroxyethylcellulose (HEC), ethylhydroxyethylcellulose (EHEC), methylethylhydroxyethylcellulose (MEHEC), hydrophobically modified ethylhydroxyethylcelluloses (HMEHEC), hydrophobically modified hydroxyethylcelluloses (HMHEC), sulfoethyl methylhydroxyethylcelluloses (SEMHEC), sulfoethyl methylhydroxypropylcelluloses (SEMHPC), and sulfoethyl hydroxyethylcelluloses (SEHEC). All these compounds are well known.

Preferably, the water soluble cellulose ether is an alkylhydroxyalkylcellulose, i.e. a cellulose based compound wherein the hydroxyl groups are partially or fully replaced by —OR groups, wherein R represents a $(C_1-C_6)$ alkyl group, a hydroxy$(C_1-C_6)$alkyl group and mixtures thereof because substituents having alkyl chains of greater than 6 carbons in length tend to impart sufficient hydrophobicity to the cellulose ether to render the compound insoluble or only slightly soluble in water. Preferably, the $(C_1-C_6)$ alkyl group is a $(C_1-C_2)$ alkyl group. Preferably, the hydroxy$(C_1-C_6)$ alkyl group is a hydroxy$(C_2-C_3)$alkyl group. More preferably, the cellulose ether is selected from methyl hydroxyethylcellulose (MHEC), an ethyl hydroxyethylcellulose (EHEC), a methyl hydroxypropylcellulose (MHPC), a methylethyl hydroxyethylcellulose (MEHEC), a methyl hydroxyethylhydroxypropylcellulose (MHEHPC) and mixtures thereof. Most preferably, the cellulose ether is selected from MHEC and MHPC.

Although the degree of substitution of the cellulose ether, calculated as the sum total of DS plus MS, is not considered to be a critical factor in providing a reduction in agglomeration, it is believed that, in the absence of gelatin, there is an inverse relationship between the tendency to form agglomerate structures as the degree of substitution is increased. It is therefore particularly surprising that a reduction in agglomeration is observed when a cellulose ether having a low DS and/or MS is added to a gypsum-based plaster or filling composition. In a preferred embodiment, the cellulose ether used in the present invention has a DS of less than 2. At the same time, the DS is preferably greater than 1. Preferably, the MS is less than 1. At the same time, whilst the MS may be O, the MS is preferably greater than or equal to 0.01 In a more preferred embodiment, the combined degree of alkyl and hydroxyalkyl substitution within the cellulose ether, is less than or equal to 2.0, more preferably less than or equal to 1.9. In an even more preferred embodiment, the cellulose ether is selected from a methylhydroxyethylcellulose having a combined degree of alkyl and hydroxyalkyl substitution of less than or equal to 1.88, a methylhydroxypropylcellulose having a combined degree of alkyl and hydroxyalkyl substitution of less than or equal to 1.99 and combinations thereof.

Although cellulose ether particle morphology is not considered to be a critical factor in providing a reduction in agglomeration, it is believed that, in the absence of gelatin, there is an increased tendency to form agglomerate structures as the cellulose ether particle dimensions decrease. An indication of particle dimensions of the cellulose ether used in the present invention may be recorded as the diameter of particle (DOP) and/or the diameter of a circle of equal projection area (EQPC). Cellulose ether particles having a desired morphology may be prepared by varying the temperature and/or by controlling the moisture content of washed cellulose ether particles prior to the initiation of a dry-grinding process. Alternatively, or indeed in addition to this, cellulose ether morphology may be controlled by the adjustment of the drying and grinding conditions such as temperature and grinding speed.

The DOP is measured by a high speed image analysis system which combines particle size and shape analysis. This specific image analysis method is described in: W. Witt, U. Köhler, J. List, Current Limits of Particle Size and Shape Analysis with High Speed Image Analysis, PARTEC 2007. The median particle diameter DOP (50,3) is defined as follows: All particle size distributions, e.g. the DOP can be displayed and applied as number (0), length (1), area (2) or volume (3) distribution. The volume distribution of the DOP is calculated as cumulative distribution $Q_3$. The volume distribution within the particle diameter value DOP (50,3) is designated by the number 3 after the comma. The designation 50, reflecting the median value, denotes 50% of the diameter of particle distribution being smaller than the given value in µm and 50% being larger. The 50% DOP value is calculated by the image analyzer software. A high speed image analysis system is commercially available from Sympatec GmbH, Clausthal Zellerfeld, Germany as dynamic image analysis (DIA) system QICPIC™. Such a system analyses the shape of the particles and takes into consideration the potential non-uniform shape of the particles into account. It thus provides a more accurate measurement of true particle sizes than other methods. The DIA system QICPIC™ is described in detail by Witt, W., Köhler, U., List, J.: Direct Imaging of very fast Particles Opens the Application of Powerful (dry) Dispersion for Size and Shape Characterisation, PARTEC 2004, Nuremberg, Germany.

The EQPC is measured by a high speed image analysis system which combines particle size and shape analysis. This specific image analysis method is described in more detail by Witt, W., Köhler, U., List, J.: Direct Imaging of very fast Particles Opens the Application of Powerful (dry) Dispersion for Size and Shape Characterisation, PARTEC 2004, Nuremberg, Germany. The EQPC (50,3) is the median diameter of a Circle of Equal Projection Area and is defined as follows: All particle size distributions, e.g. the EQPC can be displayed and applied as number (0), length (1), area (2) or volume (3) distribution. The volume distribution of the EQPC is calculated as cumulative distribution $Q_3$. The volume distribution within the diameter of a Circle of Equal Projection Area value EQPC (50,3) is designated by the number 3 after the comma. The designation 50, reflecting the median value, denotes 50% of the EQPC of particle distribution being smaller than the given value in µm and 50% being larger. The 50% EQPC value is calculated by the image analyzer software.

The cellulose ether used in the present invention preferably has a DOP (50,3) of at least 25 µm more preferably at least 30 µm. The cellulose ether preferably has a DOP (50,3) of less than or equal to 45 µm, more preferably less than or equal to 40 µm, more preferably less than or equal to 37 µm and even more preferably less than or equal to 35 µm.

The cellulose ether used in the methods of the present invention preferably has an EQPC (50,3) of at least 65 µm, more preferably at least 70 µm. The cellulose ether preferably has EQPC (50,3) of less than or equal to 100 µm, more preferably less than or equal to 90 µm, more preferably less than or equal to 80 µm, and even more preferably less than or equal to 75 µm.

Although the viscosity grade of the cellulose ether used in the present invention is not considered to be a critical factor in providing a reduction in agglomeration, it is believed that, in the absence of gelatin, there is an increased tendency to form agglomerate structures as the viscosity grade is increased. The viscosity grade of the cellulose ether, measured as a 2% aqueous solution at 20° C. using an Ubbelohde tube viscometer, is preferably greater than or equal to 1,000 mPa s, more preferably greater than or equal to 2,000 mPa s. At the same time, the viscosity grade is preferably less than or equal to 500,000 mPa s, more preferably less than or equal to 300,000 mPa s.

The modified dry mortar, plaster and filler compositions of the present invention comprise gypsum, cellulose ether and gelatin. These mortar, plaster and filler compositions all contain gypsum in an amount not less than 10 weight percent, preferably at least 40 weight percent, more preferably at least 60 weight percent and even more preferably at least 80 weight percent, based on the total dry weight of their components. In addition to gypsum, cellulose ether and gelatin, the dry mortar, plaster and filler compositions of the present invention may comprise one or more additives selected from organic or inorganic thickening agents and/or secondary water retention agents, anti-sag agents, air entraining agents, wetting agents, defoamers, superplasticizers, dispersants, calcium complexing agents, retarders, accelerators, water repellents, water redispersible polymer powders, biopolymers and fibres, all of which are well known in the art and are available from commercial sources. Such additional additives may also be mixed with the gypsum-free mixture of the present invention.

Some embodiments of the invention shall now be further described by way of exemplification only. All ratios, parts and percentages are expressed by dry weight unless otherwise specified, and all components are of good commercial quality unless otherwise specified. Abbreviations used in the Examples and Tables are listed below alongside their corresponding descriptions:

MHEC: hydroxyethyl methylcellulose commercially available from Dow Wolff Cellulosics GmbH as WALOCEL™ MKX 40000 PF 01
MHPC: hydroxypropyl methylcellulose commercially available from Dow Wolff Cellulosics GmbH as METHOCEL™ 254
Mortar: generic gypsum spray plaster base material available from Knauf Gips KG
Gelatin: semi-granular gelatin powder commercially available from Caesar & Loretz GmbH

EXAMPLES

The reduction in agglomeration upon the substitution of a specific amount of cellulose ether with a combination of cellulose ether and gelatin was demonstrated by testing various gypsum plaster compositions comprising varying amounts of MHEC or MHPC in combination with Gelatin.
Mortar Preparation Throughout the following examples, Mortar was combined with cellulose ether (MHEC or MHPC) and, where required, Gelatin in a 3 liter polyethylene bag which was subsequently sealed and manually shaken for a period of three minutes in order to form homogenous modified dry mortars.
Particle Morphology Analysis The DOP (50,3) particle size of the cellulose ether particles used in the present examples were measured using the QICPIC™ direct imaging analysis (DIA) system described in detail by Witt, W., Köhler, U., List, J.: Direct Imaging of very fast Particles Opens the Application of Powerful (dry) Dispersion for Size and Shape Characterisation, PARTEC 2004, Nuremberg, Germany. When required, the DOP (50,3) particle size was modified by adjusting the temperature and/or moisture content of the cellulose ether prior to the initiation of dry-grinding.

The EQPC (50,3) particle size of the cellulose tether particles used in the present examples was measured according to the method described by Witt, W., Köhler, U., List, J.: Direct Imaging of very fast Particles Opens the Application of Powerful (dry) Dispersion for Size and Shape Characterisation, PARTEC 2004, Nuremberg, Germany When required, the EQPC (50,3) particle size was modified by adjusting the temperature and/or moisture content of the cellulose ether prior to the initiation of dry-grinding.
Evaluation of Water Retention and Viscosity Water retention and slump, i.e. an indication of viscosity, of the resultant plaster compositions were determined in a combined test. For each test, a modified dry mortar composition was prepared at least 24 hours prior to the commencement of the test procedure by combining 700 g Gypsum (measured to an accuracy of ±0.1 g) with the desired quantities (accurate to ±0.001 g) of cellulose ether and, where required, Gelatin, as described above.

The test procedure was initiated by the addition of a modified dry mortar composition to an initial known weight of water (20° C.±1° C.) under low speed mechanical mixing conditions in a laboratory mixer over a period of fifteen seconds, before the mixing speed was increased for a further period of twenty seconds (EN 196 and DIN 1164).

A portion of the resultant gypsum plaster composition was then subsequently poured into a moist frusto-conical ring mould placed on a horizontal glass plate. The mould had the following internal dimensions: lower diameter: 100 mm; upper diameter: 70 mm; height: 60 mm. The plaster composition was then compacted to minimize air entrapment before excess plaster was removed with a steel rule. Then, within a period of sixty seconds following the completion of the stirring process, the mould was then agitated fifteen times before being lifted vertically away from the glass plate to reveal a plaster pat. Once the pat had settled on the plate, the diameter of the pat was then measured at four points with an accuracy of ±1 mm, with the average of the four values representing the standard slump of the plaster composition. Provided that an acceptable standard slump of 170±5 mm was obtained, the water retention of the plaster composition could then be recorded. However, if the standard slump had fallen outside this value, the test would be repeated using a different volume of water until an acceptable standard slump was recorded.

In order to measure water retention of the plaster composition, a known weight of the same resultant gypsum plaster composition was poured into an apparatus comprising a cylindrical ring mould (internal diameter 90 mm, height 15 mm) located on top of a stack of filter papers of known weight, wherein the top sheet of the stack was a single dry sheet of Grade 0980/1 filter paper and subsequent sheets were of Grade 2294 (8-15 μm) cellulose filter paper, both filter paper grades being commercially available from Whatman®. The composition contained within the mould was then covered with aluminium foil and left for a period of 60 minutes, when the filter paper sheets were removed and weighed.

The water-to-solid-factor of the resultant gypsum plaster composition $$\left(\text{``}\frac{W}{S}\text{''}\right)$$

and percent water retention ("WRV"), i.e. the amount of water retained in the composition in the cylindrical ring mould after 60 minutes, were then calculated as follows:

$$\frac{W}{S} = \frac{\text{initial quantity of water (g)}}{\text{quantity of modified dry mortar (g)}}$$

$$WRV = 100 - \frac{100 A\left(1 + \frac{W}{S}\right)}{\frac{W}{S} B}$$

wherein:
A=weight (in grams) of water absorbed by the filter paper sheets (i.e. the weight of the filter papers after 60 minutes minus the known dry weight of the filter papers); and
B=the weight (in grams) of resultant gypsum plaster composition within the cylindrical ring mould at the start of the test.

A minimum WRV of 75 at 60 minutes is considered acceptable for the purposes of these tests.

Example 1

The test results demonstrating the effect of MHEC and Gelatin additives upon slump, water retention and agglomeration of gypsum plaster compositions are shown below in Table 1. In each test, a modified dry mortar composition was prepared at least 24 hours prior to the commencement of the test procedure by combining 400 g Gypsum (measured to an accuracy of ±0.1 g) with the stated quantity (accurate to ±0.001 g) of MHEC having a DOP (50,3) particle size of 46.6 μm and an EQPC (50,3) particle size of 94.4 μm and, where required, Gelatin.

The agglomeration test procedure was initiated by adding over a period of thirty seconds the modified dry mortar composition to water (20° C.±1° C.) to provide a plaster composition having a w/s of 0.75 and allowing the mixture to soak for a further thirty seconds. The soaked mixture was then subjected to low speed mechanical mixing in a laboratory mixer for another thirty seconds before being transferred onto an 1800 cm² area of gypsum plasterboard. The gypsum plasterboard was then agitated so that the applied mixture evenly fills the area to a thickness of about 3 mm, without using any tools to assist levelling. The plaster is then left to set for a period of 24 to 48 hours before the number of lumps were counted and recorded in Table 1.

TABLE 1

| Example | MHEC % | Gelatin % | Slump (mm) | WRV (60 min) | MHEC: Gelatin | Total lumps |
|---|---|---|---|---|---|---|
| 1.1 | 0.24 | 0.0 | 166 | 82.5 | — | 11 |
| 1.2 | 0.228 | 0.012 | 168 | 81.7 | 19:1 | 3 |
| 1.3 | 0.216 | 0.024 | 170 | 80.5 | 9:1 | 4 |
| 1.4 | 0.192 | 0.048 | 171 | 78.7 | 4:1 | 5 |
| 1.5 | 0.168 | 0.072 | 169 | 78.6 | 7:3 | 2 |
| 1.6 | 0.24 | 0.024 | 170 | 82.0 | 91:9 | 8 |

It is evident upon comparison of Example 1.1, which contains 0.24% cellulose ether and 0% gelatin, with Examples 1.2 to 1.5, in which between 5 and 30% of the cellulose ether included in Example 1.1 has been substituted with gelatin, that agglomeration, i.e. the formation of lumps, is reduced by the substitution of up to 30% of the cellulose ether with gelatin. Further, this data indicates that such substitution of cellulose ether with gelatin does not produce a significant adverse effect upon slump and/or water retention, relative to Example 1.1. However, comparison of Example 1.1 with Example 1.6, which incorporates gelatin in an additive amount to the cellulose ether included in Example 1.1, demonstrates that the reduction in agglomeration observed in Examples 1.2 to 1.5, i.e. when the cellulose ether is substituted in part by gelatin, is not observed to the same extent when gelatin is incorporated into a dry mortar in addition to the desired amount of cellulose ether.

Example 2

The test results demonstrating the effect of MHPC and gelatin additives upon slump, water retention and agglomeration of gypsum plaster compositions are shown below in Table 2. Each test was carried out as per Example 1 except that MHPC having a DOP (50,3) particle size of 31.4 μm and an EQPC (50,3) particle size of 87.4 μm was used in place of MHEC and the resultant plaster composition had a $$\frac{W}{S}$$

of 0.63.

TABLE 2

| Example | MHPC wt % | Gelatin wt % | Slump/ consisten- cy (mm) | WRV (60 min) | MHPC: Gelatin | Total lumps |
|---|---|---|---|---|---|---|
| 2.1 | 0.24 | 0.0 | 177 | 92.9 | — | 9 |
| 2.2 | 0.228 | 0.012 | 177 | 90.6 | 95:5 | 6 |
| 2.3 | 0.216 | 0.024 | 178 | 93.5 | 9:1 | 6 |
| 2.4 | 0.192 | 0.048 | 174 | 91.7 | 8:2 | 3 |
| 2.5 | 0.168 | 0.072 | 176 | 92.2 | 70:30 | 2 |
| 2.6 | 0.24 | 0.024 | 177 | 90.4 | 91:9 | 9 |

Similar to Example 1, it is evident upon comparison of Example 2.1 with Examples 2.2 to 2.5, that agglomeration is reduced by the substitution of up to 30% of cellulose ether with gelatin. Further, this data indicates that such substitution of gelatin does not produce a significant adverse effect upon slump and/or water retention. However, comparison of Example 2.1 with Example 2.6, which incorporates gelatin in an additive amount to the cellulose ether included in Example 2.1, demonstrates that the reduction in agglomeration observed in Examples 2.2 to 2.5 is not demonstrated when gelatin is incorporated into a dry mortar in addition to the desired amount of cellulose ether.

Example 3

The test results demonstrating the effect of cellulose ether particle size upon agglomeration of gypsum plaster compositions are shown below in Table 3. In this example, MHEC particles having the desired DOP (50,3) particle sizes were prepared by adjustment of the temperature and moisture content of the cellulose ether prior to the initiation of dry-grinding. In each test, Mortars comprising 0.24% by weight MHEC were combined with water to provide a plaster composition having a $$\frac{W}{S}$$

of 0.75. The resultant plaster compositions were then spray applied to a vertical brick surface approximately 2×3 m² using a standard PFT G4 gypsum spray machine. The quality of the plaster finish was then visually observed by an expert applicator after levelling of the plaster composition and allocated a lump rating ranging from 1 ("very good") to 5 ("totally unacceptable"). The final rating score takes into consideration both the size and frequency of agglomerate structures observable on the plastered surface.

TABLE 3

| Example | MHEC Particle size (DOP(50, 3)) | Lump rating |
|---|---|---|
| 3.1 | 52 | 1.5 |
| 3.2 | 45 | 2.5 |
| 3.3 | 40 | 5 |
| 3.4 | 37 | 5 |

It is evident from the above data that each gypsum plaster composition tested suffered to some extent from agglomeration which became apparent following application and levelling. It is further evident that the problem of agglomeration may be severely exacerbated by the use of cellulose ether compounds with small particle sizes as water retention additives. In particular, it should be noted that a significant increase in the size and/or frequency of agglomerate structures was observed upon addition of cellulose ether with a DOP (50,3) particle size below 45 µm, with plaster compositions comprising cellulose ether with a DOP (50,3) particle size less than or equal to 40 µm being rated totally unacceptable.

The invention claimed is:

1. A method for providing a modified gypsum plaster or filling composition having reduced agglomeration in comparison to a gypsum plaster or filling composition comprising a water soluble cellulose ether in a specified amount X, where the specified amount is from 0.1 to 1.0 weight percent based on the total dry weight of said composition components, said method comprising:
   a) forming a dry mortar comprising gypsum binder; water soluble cellulose ether in an amount of X minus Y; and gelatin in an amount Y, wherein Y is from 0.02X to 0.30X; and
   b) combining said dry mortar with water to form a modified gypsum plaster or filling composition;
   wherein said cellulose ether is an alkylhydroxyalkylcellulose, a hydroxyalkyl cellulose, or a mixture thereof;
   wherein said cellulose ether has a median particle diameter DOP (50,3) of from 25 µm to 45 µm.

2. A method for providing a modified gypsum plaster or filling composition having reduced agglomeration in comparison to a gypsum plaster or filling composition comprising a water soluble cellulose ether in a specified amount X, where the specified amount is from 0.1 to 1.0 weight percent based on the total dry weight of said composition components, said method comprising:
   a) forming a dry mortar comprising gypsum binder; water soluble cellulose ether in an amount of X minus Y; and gelatin in an amount Y, wherein Y is from 0.02X to 0.30X; and
   b) combining said dry mortar with water to form a modified gypsum plaster or filling composition;
   wherein said cellulose ether is an alkylhydroxyalkylcellulose, a hydroxyalkyl cellulose, or a mixture thereof;
   wherein said cellulose ether has a median particle diameter of the equivalent particle circle EQPC (50,3) of from 65 µm to 100 µm.

* * * * *